United States Patent Office 3,559,387
Patented Feb. 2, 1971

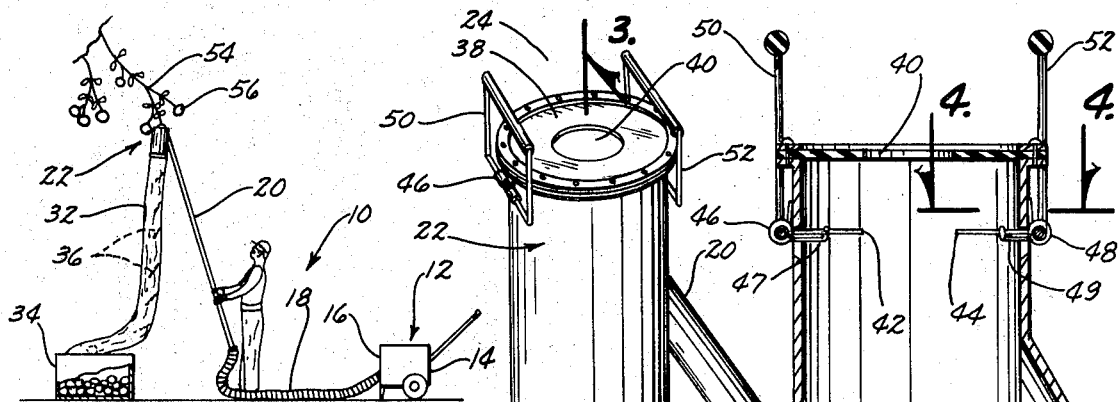

3,559,387
FRUIT PICKING APPARATUS
Robert R. Myers, Boca Raton, Fla., assignor to Elliott Brothers (London) Limited, London, England, a company of Great Britain
Filed Dec. 2, 1968, Ser. No. 780,353
Int. Cl. A01g 19/08
U.S. Cl. 56—334                                    3 Claims

ABSTRACT OF THE DISCLOSURE

A fruit picking apparatus comprising, a vacuum pump having a vacuum line extending therefrom and having a hollow cannister secured to the end thereof. The hollow cannister is in vacuum communication with the vacuum pump and has a fruit chute operatively connected to the lower end thereof which extends to a fruit receptacle. A flexible diaphragm extends across the upper end of the cannister and has a central opening formed therein which has a diameter less than the diameter of the fruit being picked. A pair of levers are pivotally secured to the cannister below the flexible diaphragm and are pivotally activated upon the passage of fruit through the diaphragm. The pair of levers have stem engaging portions extending upwardly therefrom which are pivotally moved into engagement with the fruit stem on the fruit passing through the central opening of the diaphragm and coming into engagement with the pair of levers.

---

Therefore, it is a principal object of this invention to provide a fruit picker utilizing a vacuum power unit.

A further object of this invention is to provide a vacuum operated fruit picker which pulls the fruit from the stem and deposits the same in a receptable in a gentle manner to avoid damaging the fruit.

A further object of this invention is to provide a fruit picking apparatus which permits the operator to remain on the ground while picking fruit from the tree.

A further object of this invention is to provide a fruit picking apparatus which includes means thereon which engages the stem from which the fruit is suspended.

A further object of this invention is to provide a vacuum operated fruit picking apparatus which is extremely efficient in operation.

A further object of this invention is to provide a fruit picking apparatus which is easy to operate.

A still further object of this invention is to provide a fruit picking apparatus which is economical to manufacture and durable in use.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings in which:

FIG. 1 is an elevational view illustrating the apparatus in use.

FIG. 2 is an enlarged fragmentary top perspective view of the apparatus.

FIG. 3 is an enlarged sectional view as seen on lines 3—3 of FIG. 2, illustrating the normal positioning of the component parts.

FIG. 4 is a fragmentary sectional view taken on lines 4—4 of FIG. 3.

FIG. 5 is a view similar to FIG. 3 and illustrating the relationship of the component parts as the fruit enters the cannister.

FIG. 6 is a view similar to FIGS. 3 and 5 and illustrating the relationship of the component parts as the fruit passes the oppositely disposed levers.

FIG. 7 is a sectional view taken on lines 7—7 of FIG. 6.

The fruit picking apparatus of this invention is generally designated by the reference numeral 10 and includes a vacuum pump 12 having an exhaust end 14 and intake end 16. Preferably, the vacuum pump means is driven by a gasoline engine of approximately five horsepower and should include a squirrel cage fan means. A flexible vacuum line 18 is secured to the intake end of the vacuum pump. A rigid vacuum line handle 20 is secured to the end of the flexible vacuum line 18 and is preferably constructed of aluminum or the like. The numeral 22 generally designates a hollow cannister having an upper end 24 and a lower end 26.

The lower end of the cannister 22 is normally closed by a spring loaded door 28 pivotally connected thereto at 30. The door 28 is normally closed by the spring means 31 associated therewith and is also held closed by the vacuum pressure within the cannister 22. A flexible fruit chute 32 is secured at its upper end to the lower end of the cannister 22 and extends downwardly therefrom to a fruit receptacle 34 such as a packing box or the like. The chute 32 may be constructed of cloth or plastic material and has a plurality of flexible vanes 36 provided therein to slow the descent of the fruit therethrough.

A flexible diaphragm 38 extends across the upper end of cannister 22 and has a central opening 40 formed therein. Preferably, diaphragm 38 is constructed of a rubber material or the like and the central opening 40 should have a diameter less than the diameter of the fruit being picked. A pair of oppositely disposed resilient levers 42 and 44, are pivotally connected to the cannister at 46 and 48, respectively, and normally extends towards each other in a substantially parallel position with respect to the diaphragm 38. Levers 42 and 44 include stem engaging portions 50 and 52, respectively, which extend upwardly therefrom and which are pivotally movable with the levers 42 and 44. The portions 50 and 52 normally extend upwardly with respect to the cannister 22 but are pivotally moved into engagement with the stem 54 as the fruit 56 passes through the central opening 40 and pivotally moves the levers 42 and 44 downwardly and outwardly with respect to the central opening. Levers 42 and 44 and portions 50 and 52 are normally maintained in the position of FIG. 3 by the spring means 47 and 49 respectively.

In operation, the vacuum pump means 12 is started and the operator raises the cannister 22 by means of the vacuum line handle 20 so that the fruit 56 is placed over the central opening 40. When the fruit 56 is placed over the central opening 40, the opening is sealed and the vacuum pressure causes the fruit to be sucked into the interior of the cannister 22. The diaphragm 38 stretches to permit the fruit to pass through the central opening 40 and the downwardly passing fruit 56 causes levers 42 and 44 to be pivotally moved downwardly and outwardly with respect to the central opening. The pivotal movement of the levers 42 and 44 causes the stem engaging portions 50 and 52 to be pivotally moved into engagement with the stem 54 thereby holding the same firmly while the fruit is disengaged therefrom by the vacuum pressure. As the fruit 56 passes through the diaphragm 38, the suction is released and the fruit drops through the spring loaded door 28 in the lower end of the cannister 22 and passes into the fruit chute 32. The vanes 36 slow the descent of the fruit through the fruit chute 32 to prevent damage to the fruit.

As soon as the fruit 56 has passed through the door 28 in cannister 22, the spring means 31 associated with the door 28 causes the door 28 to again close the lower end of the cannister 22. The door 28 is also maintained in a closed position by the suction pressure exerted within the cannister.

It has been found that approximately fifteen pounds of vacuum pressure is needed to remove oranges from their supporting stems and the vacuum pressure would be accordingly adjusted for such other fruits as apples, peaches, etc. It can be seen that the unique fruit picking apparatus has been provided which gently removes the fruit from its supporting stem. The apparatus disclosed herein permits an operator to easily reach fruit which is some height above the ground. The apparatus of this invention is extremely efficient in operation and is durable in use. The fruit picking apparatus disclosed herein permits an operator to readily pick large quantities of fruit from the trees with a minimum of effort and a maximum of efficiency. Thus it can be seen that the apparatus accomplishes at least all of its stated objectives.

I claim:
1. In a fruit picking apparatus,
 a vacuum pump having a vacuum line extending therefrom,
 a hollow cannister haivng upper and lower ends, said cannister being secured to and in vacuum communication with said pump,
 a fruit chute operatively connected to the lower end of said cannister,
 and a flexible diaphragm extending across said cannister adjacent the upper end thereof and having a central opening formed therein adapted to permit the passage of fruit therethrough, said cannister having first and second levers pivotally secured thereto, said first and second levers being positioned below said diaphragm and on opposite sides of said central opening, said first and second levers having stem engaging portions extending upwardly therefrom and upwardly from said cannister, said first and second levers being pivotally moved by fruit passing through said diaphragm central opening, the pivotal movement of said first and second levers causing said stem engaging portions to be moved into engagement with the stem from which the fruit is suspended, said stem engaging portions engaging the stem above the upper end of said cannister.

2. The apparatus of claim 1 wherein said first and second levers are resilient.

3. The apparatus of claim 1 wherein said diaphragm central opening has a diameter less than the diameter of the fruit being picked.

References Cited
UNITED STATES PATENTS

| | | | |
|---|---|---|---|
| 1,069,849 | 8/1913 | Byrne | 56—340 |
| 1,368,496 | 2/1921 | Frey et al. | 56—340 |
| 2,288,682 | 7/1942 | Chittenden | 56—334 |
| 2,545,072 | 3/1951 | Denman | 56—332 |
| 2,661,587 | 12/1953 | Bullock | 56—334 |
| 2,711,625 | 6/1955 | Bullock | 56—332 |
| 2,990,669 | 7/1961 | Klemm, Jr. | 56—334 |

RUSSELL R. KINSEY, Primary Examiner